Figure 1:
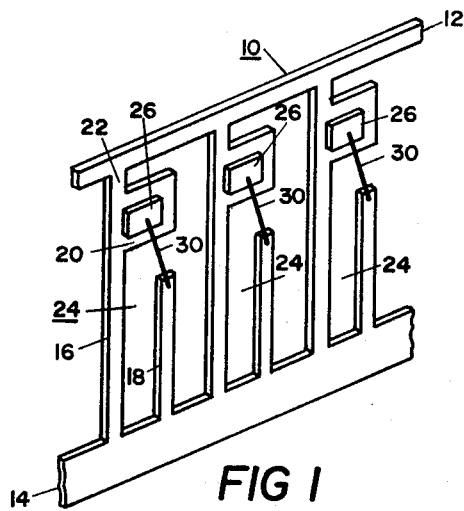

United States Patent
Grenon

[15] 3,660,669
[45] May 2, 1972

[54] OPTICAL COUPLER MADE BY JUXTAPOSITION OF LEAD FRAME MOUNTED SENSOR AND LIGHT EMITTER

[72] Inventor: Lawrence A. Grenon, Phoenix, Ariz.
[73] Assignee: Motorola, Inc., Franklin Park, Ill.
[22] Filed: Apr. 15, 1970
[21] Appl. No.: 28,585

[52] U.S. Cl. .................................. 250/217 S, 250/239
[51] Int. Cl. ............................... H01j 5/02, H01j 39/12
[58] Field of Search ................... 250/217 S, 239, 217 SS

[56] References Cited

UNITED STATES PATENTS 3,245,002   4/1966   Hall ........................... 250/217 S
3,167,658   1/1965   Richter ....................... 250/239

OTHER PUBLICATIONS

Wolff; Michael F., " Look at What Optical Semiconductors Do Now," Electronics, Vol. 36, n. 26, 6/28/63, p. 32

Primary Examiner—James W. Lawrence
Assistant Examiner—T. N. Grigsby
Attorney—Mueller, Aichele & Rauner

[57] ABSTRACT

An inexpensive encapsulated coupled pair of elements, one of which is a light emitter and the other of which is a light sensor, comprise an encapsulated optical coupler, and the method of making them is disclosed.

5 Claims, 7 Drawing Figures

PATENTED MAY 2 1972 3,660,669

INVENTOR.
Lawrence A Grenon
BY
Mueller, Aichele, & Rauner
Atty's

OPTICAL COUPLER MADE BY JUXTAPOSITION OF LEAD FRAME MOUNTED SENSOR AND LIGHT EMITTER

An optical coupling device, which comprises a current or voltage controlled solid state light emitter and a solid state light sensor, the light sensor being positioned to pick up the light emitted by the emitter, and acting to change the picked up light into a current or voltage is well known. Such an optical coupling device is very useful where unintentional coupling between two electrical circuits must be minimized since there is no direct electrical or indirect capacitive or inductive coupling between the light emitter and the light sensor. Known optical coupling devices are expensive since they are fairly elaborate devices that are made by the assembly in a casing of a light emitter and a light sensor that are usually individually produced. The manner of making the optical coupler device of the prior art requires many steps and a considerable amount of material. Reference may be had to a patent application by the instant inventor, Ser. No. 854,114, filed Aug. 29, 1969, abandoned 4-19-71, and assigned to the assignee of this application, to show a typical prior art optical coupling device.

It is an object of this invention to provide simple, inexpensive encapsulated light coupling devices, comprising a light emitting solid state device and a light sensing solid state device.

It is a further object of this invention to provide a method of making the simple inexpensive encapsulated light coupling device.

SUMMARY

In accordance with this invention, many solid state light emitters are made in strip form and many solid state light sensors are also made in strip form. The individual emitters and the individual sensors are so arranged in their strip form that they may be positioned so that the active elements thereof are face to face and separated by a very short distance. To preserve this relative positioning, the strips are placed in a mold where they are so arranged face to face and the container is filled with a liquid that is curable and/or hardenable and that is transparent to the light rays emitted by the light emitter when cured or hardened, and the liquid is cured. The pairs of emitters and sensors are cut apart and the parts of the strip that provide strength thereto during the molding operation are cut away leaving a four lead, two leads for electrical input and two for electrical output, encapsulated optical coupling device. If desired, the encapsulated coupling device may be coated with a material which is opaque to the light to which the sensor is sensitive, to keep the ambient light from affecting the coupler, and also it is desirable that the coating material be reflective to enhance the coupling efficiency by providing reflection at the interface between the opaque material and the encapsulating material. Before encapsulation, the strips may be arranged so that the leads come out from the same side, or from opposite sides of the coupling device, or even at right angles to each other. If a three lead light sensor is used, the encapsulated coupler may have a total of five leads. Using different emitters and/or sensors, the number of leads may vary.

DESCRIPTION

Figure 2:
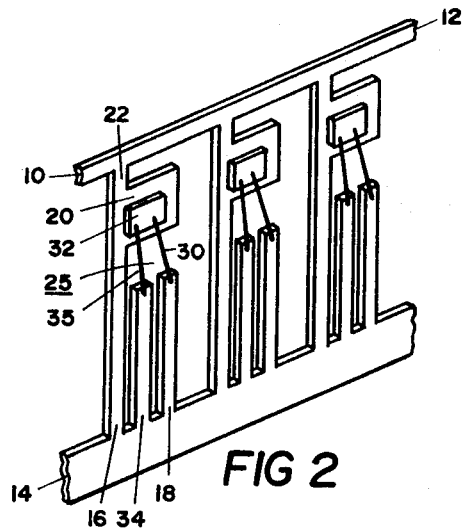
Figure 3:
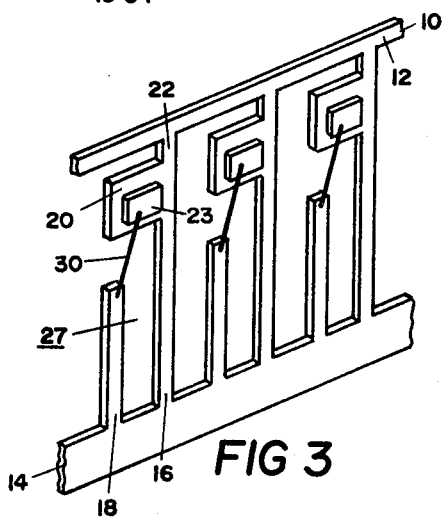
Figure 4:
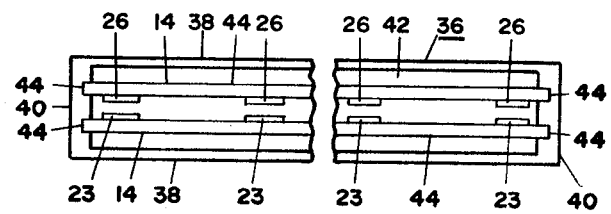
Figure 5:
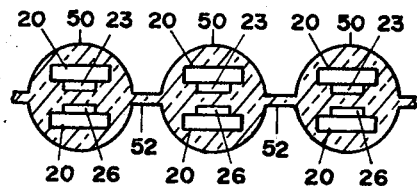
Figure 7:
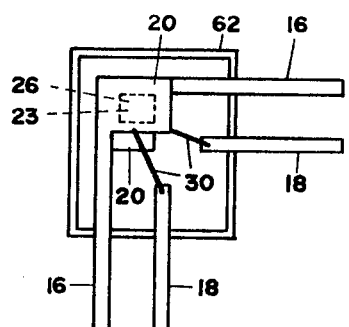
Figure 6:
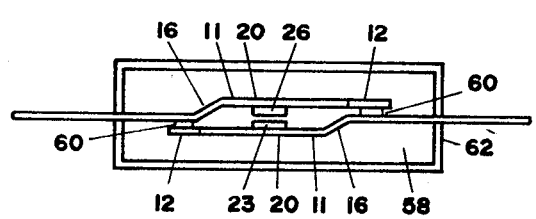

The invention may be better understood upon reading the following description in connection with the accompanying drawing in which FIG. 1 shows solid state light detectors of the diode type in strip form, FIG. 2 shows solid state light detectors of the transistor type, also in strip form, FIG. 3 shows solid state light emitters of the diode type also in strip form, FIG. 4 shows a mold having a strip such as that of FIG. 1 or FIG. 2, as well as a strip such as that of FIG. 3, positioned therein, ready to put encapsulating fluid into the mold, FIG. 5 shows partially finished coupled emitter and sensor pairs of a form produced by a mold (not shown) having elliptical pockets, FIG. 6 shows a solid state optical coupling device in which the leads extend from opposite sides of the coupling device, and FIG. 7 shows a solid state optical coupling device in which the leads extend at an angle of about 90° from each other.

Turning first to FIG. 1, a relatively stiff metal strip 10 is provided. The strip 10 comprises an upper longitudinally extending locating and stiffening bar 12 and a lower longitudinally extending locating and stiffening bar 14. A pair of leads 16 and 18 extend from the lower bar 14 towards the upper bar 12. The lead 18 extends most of the way from the bar 14 towards the flag 20, mentioned below. The lead 16 extends nearly all the way to the bar 12 and an integral flag 20 extends to one side, the right side as viewed in FIG. 1, of the lead 16 beyond the end of the lead 18. The upper end of the flag 20 is connected to the bar 12 as by a connector 22. While the connector 22 may be wider than the lead 16 and offset with respect to the center of the flag 20, it may be as narrow as the lead 16 and may take any desired position with respect to the center of the flag. The leads 16 and 18 and the flag 20 form a frame at 24. As many frames 24 as is desired constitute a strip 10. All the leads 16 and 18 and all the connectors 22 and all the flags 20 may be in the same plane. A diode chip 26 is positioned on each flag 20 and the bottom thereof is connected to the flag 20 and therefore to the lead 16. The top of the diode chip 26 is connected to the lead 18 as by a wire 30. Upon cutting away the bars 12 and 14 at a later step of the method to be described, each pair of leads 16 and 18 comprise connections to a diode 26. As is known, a semiconductor diode as described and also those of known designs are sensitive to light and other such devices are light producing when properly energized.

FIG. 2 resembles FIG. 1, whereby similar reference characters have been given to similar portions thereof. FIG. 2 differs from FIG. 1 in that a transistor chip 32 or another three element light sensitive device is mounted on the flag 20 and a base lead 34 is provided between the leads 16 and 18 and equal in length to the lead 18. The lead 34 is connected to the base on the chip 32 by means of a connection 35. The lead 16 constitutes the collector connection for the transistor chip 32. The lead 34 may be the base lead and the lead 18 may be an emitter lead. The leads 16, 18 and 34, the flag 20 and the connector 22 comprise a frame 25. Many frames 25 are included in the strip 10 of FIG. 2. As is known, when the base connection of the transistors of FIG. 2 are left open, the resultant devices are light sensitive. In such a connection, if desired, the base lead 34 may be entirely left out, resulting in a package similar to that of FIG. 1, using, however, a transistor light sensor instead of a diode light sensor.

The strip 10 of FIG. 3 may be the same in shape as the strip 10 of FIG. 1, turned over, however, from left to right. The strip 10 of FIG. 3 comprises an upper and lower bars 12 and 14, leads 16 and 18 and flags 20 as in FIG. 1, however the flag 20 extends to the left from the lead 16 in FIG. 3 and a light emitting chip 23 is placed on the front face of the flag 20 as shown in FIG. 3. It will be understood that chip 23 can be light emitting or sensing in which case the chip 26 will be light sensing or light emitting respectively. Whatever form the light sensor takes it must be coupled with a light emitter. The light emitter in certain of its forms may have more than two leads. The elements 16, 18, 20 and 22 of FIG. 3 comprise a frame 27. The strip of FIGS. 1 and 2 on the one hand and the strip of FIG. 3 on the other hand are so dimensioned that if one chip 23 of FIG. 3 is positioned to register with and to be face to face with a chip 26 of FIG. 1 or with a chip 32 of FIG. 2, the bars 12 and 14 of the strips of FIG. 3 being positioned to register with the bars 12 and 14 of the strips of FIG. 1 or FIG. 2, the other chips 23 and 26 (or 32) of the two strips 10 will also be face to face and will register with each other. Any configuration of strips 10 and chips 26 to produce this face to face relationship of chips 23 and 26 (or 32) on a pair of strips is contemplated by this invention.

A mold that is useful for positioning one strip of FIG. 1 or 2 and the strip of FIG. 3 face to face and for molding is shown in FIG. 4. The mold 36 comprises a box having an open top and side walls 38 and end walls 40 and a bottom wall 42. The end walls 40 and the bottom wall 42 is formed with parallel grooves 44 to accept the top and lateral edges of the bar 12 of the strips 10. The leads 16 and 18, or 16, 18 and 34 if the transistor type light sensor of FIG. 2 is used, point upwards. After a strip of FIG. 1 or FIG. 2 is put in one of the grooves 44 and a strip of FIG. 3 is put in the other groove 44, the mold 36 is filled to a point partially up the lead 16 with a fluid material which is transparent to the light emitted by the light emitter when the fluid is cured or hardened, and the fluid is cured or permitted to harden. The molded assembly is then taken out of the mold 36 and the bars 12 and 14 are cut off and the several encapsulated optical couplers, each comprising a frame 24 or 25 and a frame 27 and its leads and chips, are separated by scoring and breaking or by sawing. The semifinished encapsulated optical coupler is finished by coating the transparent material with a material (see for example 62 of FIGS. 6 and 7) which is opaque and preferably reflective to light to which the sensor is sensitive.

The mold of FIG. 4 is shown as being rectangular. The inside thereof may have any desired shape such as the shape of many elliptical cylinders joined by necked portions. The so shaped molds however must include grooves to receive the bars 12. When such a mold having elliptical pockets is used, the joined elliptical optical sensing devices 50 of FIG. 5 are produced instead of rectangular ones as produced by the mold 36 of FIG. 4. The neck portions 52 may be broken away much easier to separate the individual optical couplers 50 of FIG. 5 than the individual couplers produced by the mold 36 can be separated. Each separate coupler comprises a first flag 20 and a chip 26 (or 32) mounted thereon and leads therefor comprising the optical sensor and a flag 20 and a chip 23 mounted thereon and the leads therefor comprising the light emitter, the chips 23 and 26 (or 23 and 32) being face to face and separated from each other. Each optical coupler includes four leads 16, 18 and 16, 18 or includes five leads 16, 34 and 18 and 16 and 18 (not shown in FIG. 5). If three leads 16, 34 and 18 are used, the leads 16, 34 and 18 may be connected to provide a diode connection for the transistor deposited on the chip 32. The leads, using the mold of FIG. 4, or a similar mold produces a light coupler in which all the leads are parallel and extend in the same direction from the molded body of the encapsulated light coupler.

If it is desired to produce a light coupler in which the leads extend in the opposite direction and lie in the same plane, a configuration of FIG. 6 may be used. In FIG. 6, the strips 11,11 may be provided by bending the strips 10,10 so that when the chips 26, 23 (or 23 and 32) are positioned face to face but slightly spaced from each other, the bar 12 of each strip 11 is slightly spaced from the leads 16 and 18 of the other strip 11. This may be accomplished by bending lead 16 just below the flag 20 at an obtuse angle and then bending the leads back again so that the lower part of the lead 16 is parallel with the flag 20. Molding material 58 is poured around the bars 12 and the flags 20 and the upper parts of the leads 16 and 18 (or 16, 18 and 34) below the bends therein. Spacers 60 may be provided between the parallel facing portion of the leads 16 and the bars 12 to assure proper spacing of the chips 23 and 26 (or 23 and 32) and to prevent short circuits between the bars 12 and the leads 16 and 18 or any one of them. Then after the individual couplers are cut apart opaque and preferably reflective material 62 is deposited on the material 58 as before. The resultant light coupler package exhibits leads that extend in opposite directions and in the same plane. If it be desired that the leads, though extending in opposite directions, be in line, the flags 20 may extend in the same direction from the leads 26 and the chips will be on the facing sides of the flags. If it is desired that the leads not be in the same plane, the frames need not be bent and the spacers may be thicker.

If desired, the leads may extend perpendicularly from each other as shown in FIG. 7. It is necessary that the chips 23 and 26 (or 23 and 32), they being shown in dotted lines, face each other and that they be spaced and that the flags 20,20 and the leads 16 and 18 as well as the connecting wires 30 of the sensor and of the light emitter be insulated from each other.

Due to the stamping process of forming the frames 24, 25 and 27 for the light sensors and light emitters and due to the molding process of assembling the light couplers, many encapsulated optical couplers can be produced very cheaply and very quickly cutting the cost of the finished light or optical coupler to a minimum amount.

What is claimed is:

1. An optical coupler comprising:
   a semiconductor light sensor having at least two electrodes and being in chip form with said chip having one face adapted to receive light and to couple said light into the bulk of said sensor where the energy contained in said light is converted into the output signal from said sensor;
   a first lead frame having a number of extensions, one of said extensions having a flag-like protrusion, said semiconductor light sensor being mounted on said flag-like protrusion such that said face adapted to receive light is exposed, one of the electrodes to said light sensor being electrically coupled to said first lead frame extension protrusion, other of the extensions of said first lead frame being connected to other electrodes from said semiconductor light sensor;
   a light emitting semiconductor device having at least two electrodes and being in chip form with said chip having a face from which light is emitted;
   a second lead frame having a number of extensions, one of said extensions having a flag-like protrusion, said light emitting semiconductor device being mounted on said last mentioned flag-like protrusion such that said face from which said light is emitted is exposed, one electrode of said light emitting semiconductor being connected to said last mentioned flag-like protrusion and other extensions of said second lead frame being connected to other electrodes of said light emitting semiconductor,
   said first and second lead frames being juxtaposed in such a manner that said chip faces are parallel and opposed to one another in spaced relationship one to the other such that the light generated normal to the face of said light emitting semiconductor device is intersected by the face of said sensor adapted to receive light without reflection, whereby a direct optical coupling between light emitting semiconductor and sensor is achieved.

2. The optical coupler as recited in claim 1 wherein the space between said opposing chip faces is filled with a transparent material having an index of refraction greater than 1 which optically couples the emission from said light emitting semiconductor into said sensor better than air.

3. The optical coupler as recited in claim 2 wherein said transparent material surrounds said chips and lead frames such that said transparent material encapsulates said optical coupler serving both a housing and an optical coupling function.

4. The optical coupler as recited in claim 3 wherein said transparent material is epoxy.

5. The optical coupler as recited in claim 3 and further including a reflective member surrounding said transparent material and serving to reflect back into said transparent material any stray light emitted by said light emitting semiconductor device.

* * * * *